United States Patent
Szostak

(10) Patent No.: US 10,043,070 B2
(45) Date of Patent: Aug. 7, 2018

(54) IMAGE-BASED QUALITY CONTROL

(71) Applicant: MICROSOFT TECHNOLOGY LICENSING, LLC, Redmond, WA (US)

(72) Inventor: Kamil Szostak, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 204 days.

(21) Appl. No.: 15/010,901

(22) Filed: Jan. 29, 2016

(65) Prior Publication Data

US 2017/0220857 A1 Aug. 3, 2017

(51) Int. Cl.
*G06K 9/00* (2006.01)
*G06F 17/30* (2006.01)
(Continued)

(52) U.S. Cl.
CPC ..... *G06K 9/00442* (2013.01); *G06F 17/3028* (2013.01); *G06F 17/30991* (2013.01); *G06K 9/00228* (2013.01); *G06K 9/03* (2013.01); *G06K 9/4652* (2013.01); *G06K 9/52* (2013.01); *G06K 9/6201* (2013.01); *G06T 7/0079* (2013.01); *G06T 7/408* (2013.01); *G06T 7/60* (2013.01); *G06K 2009/4666* (2013.01);
(Continued)

(58) Field of Classification Search
CPC ............ G06K 9/00442; G06K 9/6201; G06K 9/00228; G06K 9/03; G06K 9/4652; G06K 9/52; G06K 2009/4666; G06K 2215/0085; G06T 7/60; G06T 7/0002; G06T 7/194; G06T 7/136; G06T 2207/30201; G06T 2207/30168; G06T 2207/30144; G06T 2207/30176; G06T 2207/10008; G06F 17/3028; G06F 17/30991; H04N 1/00034

See application file for complete search history.

(56) References Cited

U.S. PATENT DOCUMENTS 5,754,674 A 5/1998 Ott et al.
8,667,127 B2 3/2014 Bettis et al.
(Continued)

OTHER PUBLICATIONS

"International Search Report and Written Opinion Issued in PCT Application No. PCT/US2017/013840", dated Mar. 21, 2017, 11 Pages.

*Primary Examiner* — Carol Wang
(74) *Attorney, Agent, or Firm* — Shook, Hardy & Bacon, L.L.P.

(57) ABSTRACT

Aspects of the technology described herein detect visible abnormalities within a webpage or other document. The technology improves computing accuracy by identifying data and/or programing errors that cause the abnormalities. The abnormalities are detected through image analysis of portions of a document. Initially, a portion of a webpage associated with a particular feature is identified and then converted to a digital image. The digital image can capture the website as it would appear to a user viewing the website, for example, in a web browser application. The image is then analyzed against an established feature-pattern for the feature to determine whether the image falls outside of a normal range. When the image of a portion of the webpage falls outside of the normal range, a notification can be communicated to a person associated with the webpage, such as a system administrator.

21 Claims, 8 Drawing Sheets

(51) Int. Cl.
  *G06K 9/46* (2006.01)
  *G06K 9/52* (2006.01)
  *G06K 9/62* (2006.01)
  *G06T 7/00* (2017.01)
  *G06T 7/40* (2017.01)
  *G06T 7/60* (2017.01)
  *G06K 9/03* (2006.01)

(52) U.S. Cl.
  CPC ............... *G06T 2207/20144* (2013.01); *G06T 2207/30168* (2013.01); *G06T 2207/30201* (2013.01)

(56) References Cited

U.S. PATENT DOCUMENTS

| | | | |
|---|---|---|---|
| 2002/0048411 A1* | 4/2002 | Takayama | G06K 9/40 382/275 |
| 2002/0168116 A1* | 11/2002 | Takayama | H04N 1/40056 382/275 |
| 2008/0292176 A1* | 11/2008 | Sakai | G06T 7/001 382/144 |
| 2010/0124362 A1* | 5/2010 | Wu | G03G 15/0152 382/112 |
| 2013/0086031 A1 | 4/2013 | Marantz et al. | |
| 2014/0092419 A1* | 4/2014 | Yamagishi | G06T 7/001 358/1.14 |
| 2014/0270397 A1* | 9/2014 | Sochi | G06T 7/001 382/112 |
| 2015/0269719 A1* | 9/2015 | Kitai | H04N 1/04 358/474 |

\* cited by examiner

| AREA CODE | STATE/PROVINCE | MAJOR CITIES BY POPULATION |
|---|---|---|
| AREA CODE 201 | NEW JERSEY | BAYONNE, JERSEY CITY, UNION CITY |
| AREA CODE 202 | DISTRICT OF COLUMBIA | WASHINGTON |
| AREA CODE 203 | CONNECTICUT | BRIDGEPORT, DANBURY, MERIDEN |

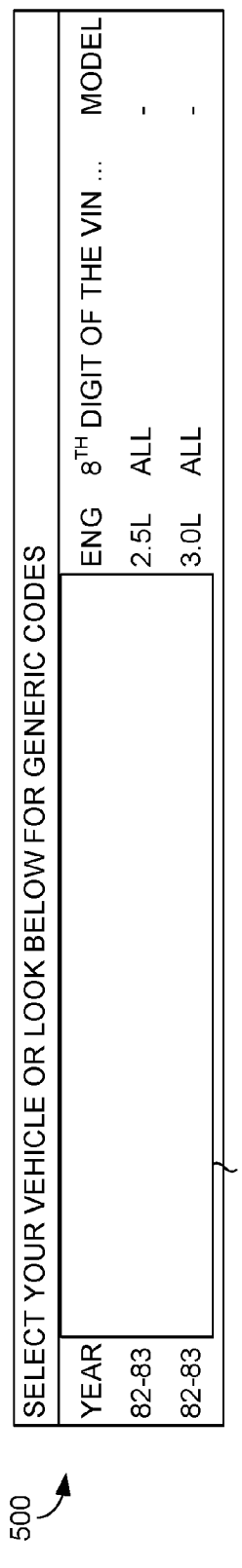
FIG. 5.
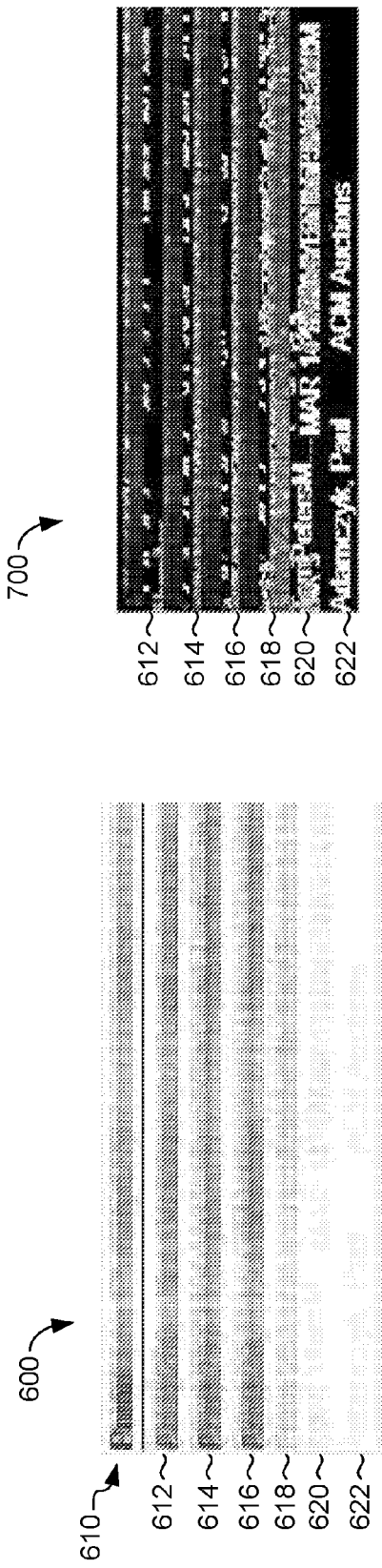
FIG. 7.
FIG. 6.

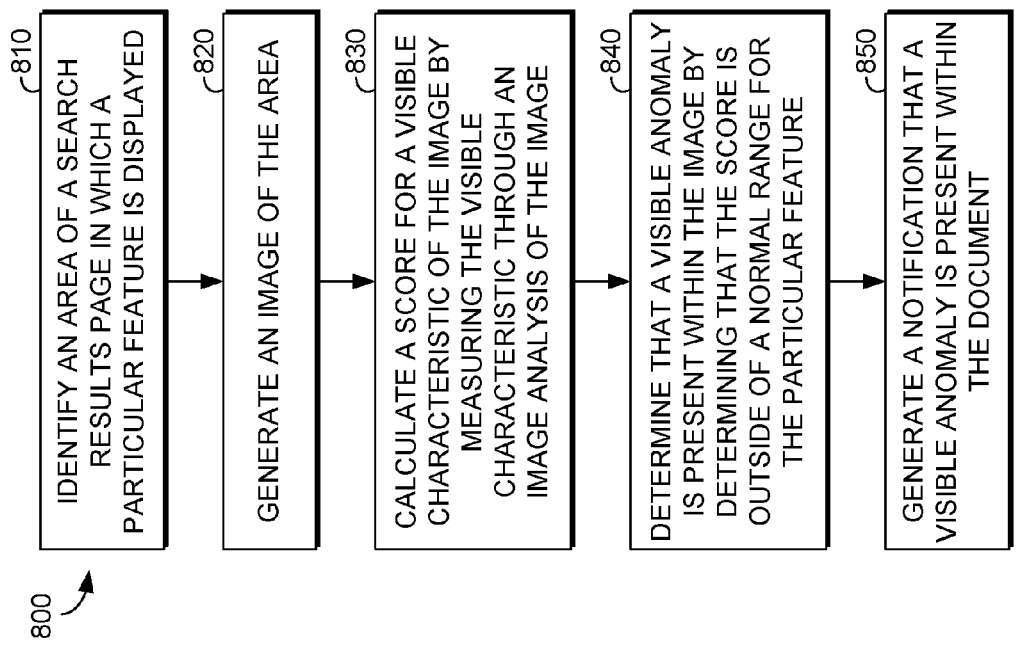

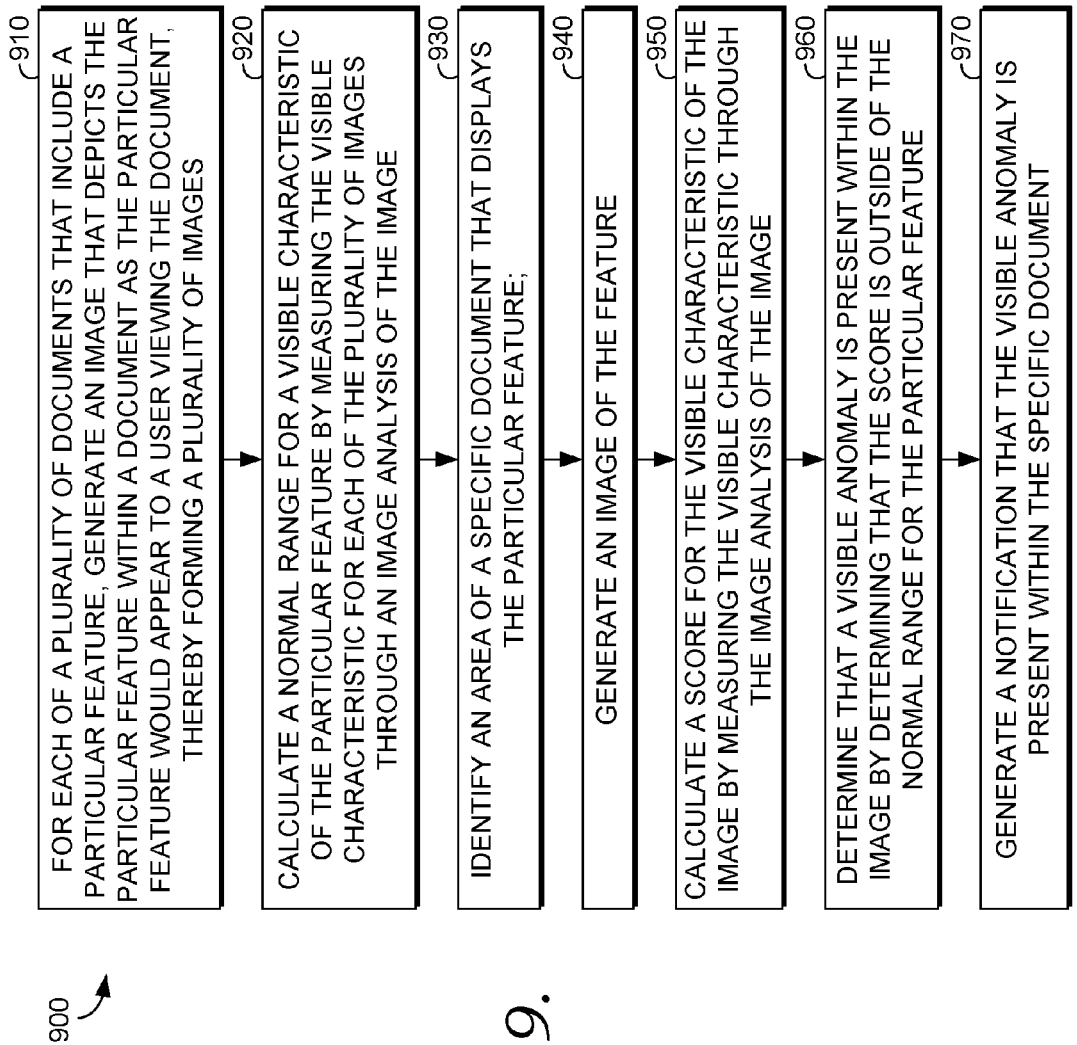

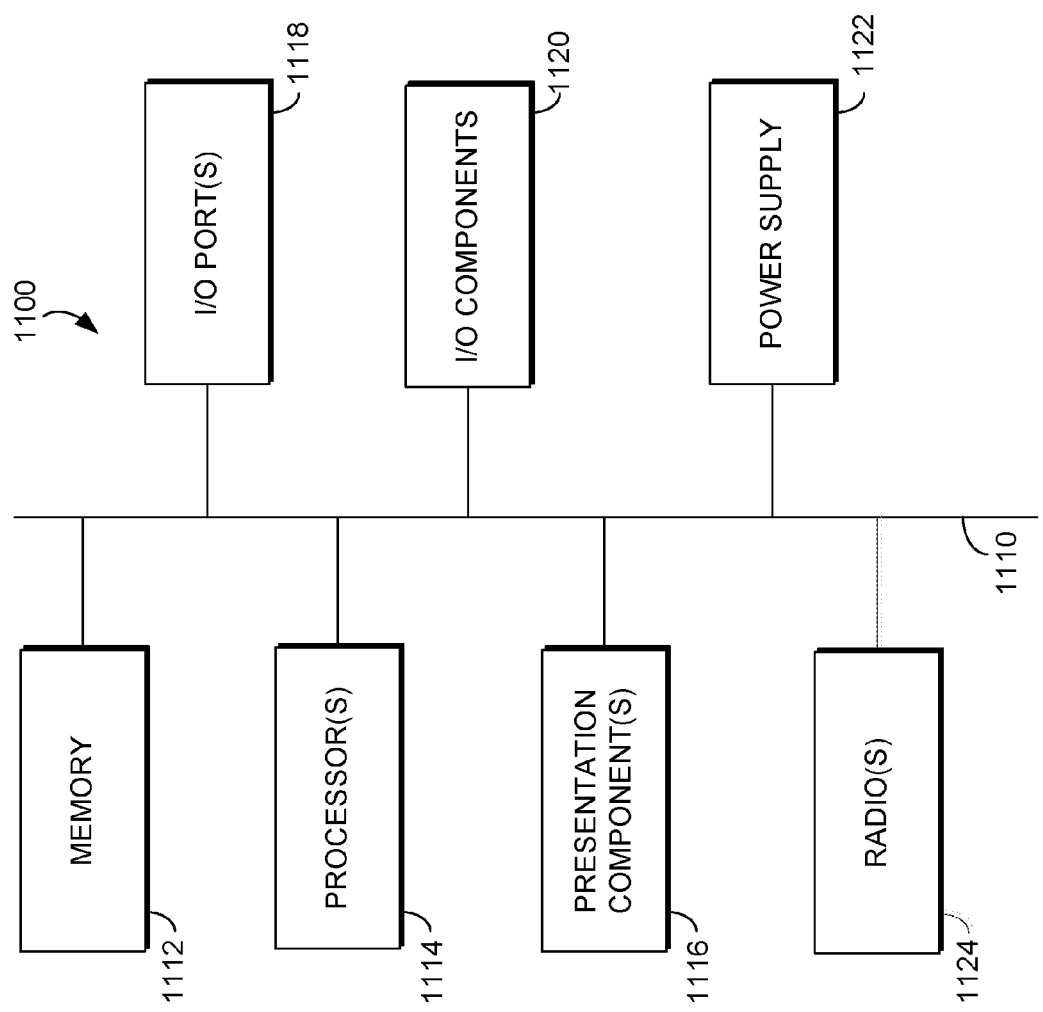

IMAGE-BASED QUALITY CONTROL

BACKGROUND

Modern webpages can be generated by combining data from multiple sources in real time. Almost a limitless number of variations can be created for an individual webpage making quality control very difficult. For example, a table on a webpage could be populated with data drawn from one or more knowledge bases in response to a query. Images and advertisements could be presented from other sources. A search engine might generate search results in multiple formats. In each case, a mismatch between source data and presentation instructions can cause display abnormalities on the webpage. For example, a table could be presented with multiple blank fields because the underlying database does not have data for certain fields. In another example, too much or too little space could be allocated to a field in a table. Catching and fixing these errors remains a challenge.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein detect visible abnormalities within a webpage or other document. The technology improves computing accuracy by identifying data and/or programing errors that cause the abnormalities. The abnormalities are detected through image analysis of portions of a document. Initially, a portion of a webpage associated with a particular feature is identified and then converted to a digital image. The digital image can capture the website as it would appear to a user viewing the website, for example, in a web browser application. The image is then analyzed against an established feature-pattern for the feature to determine whether the image falls outside of a normal range. When the image of a portion of the webpage falls outside of the normal range, a notification can be communicated to a person associated with the webpage, such as a system administrator.

In one aspect, the technology is used to analyze dynamic websites with content that changes automatically. For example, the technology can be used to analyze one or more features of a search results webpage. The search result webpage is dynamically generated by combining data selected from one or more sources with a display template. The display templates may be similar for each page, but the data selected can be unique for each page. Given the combination of factors that are used to select and rank search results, a very large amount of unique search result pages could be built. It is not practical to run quality checks for each possibility in advance.

BRIEF DESCRIPTION OF THE DRAWINGS

Aspects of the technology described in the present application are described in detail below with reference to the attached drawing figures, wherein:

FIG. 5 is a diagram depicting a table with an excessive column width, in accordance with an aspect of the technology described herein;

FIG. 6 is a diagram depicting an average image generated by combining a plurality of images, in accordance with an aspect of the technology described herein;

FIG. 7 is a diagram depicting a reverse image of an average image generated by combining a plurality of images, in accordance with an aspect of the technology described herein;

FIG. 8 is a diagram depicting a flow chart for a method of detecting display abnormalities using image analysis, in accordance with an aspect of the technology described herein;

FIG. 9 is a diagram depicting a flow chart for a method of detecting display abnormalities using image analysis, in accordance with an aspect of the technology described herein;

FIG. 11 is a block diagram of an exemplary computing environment suitable for implementing aspects of the technology described herein.

DETAILED DESCRIPTION

Figure 1:
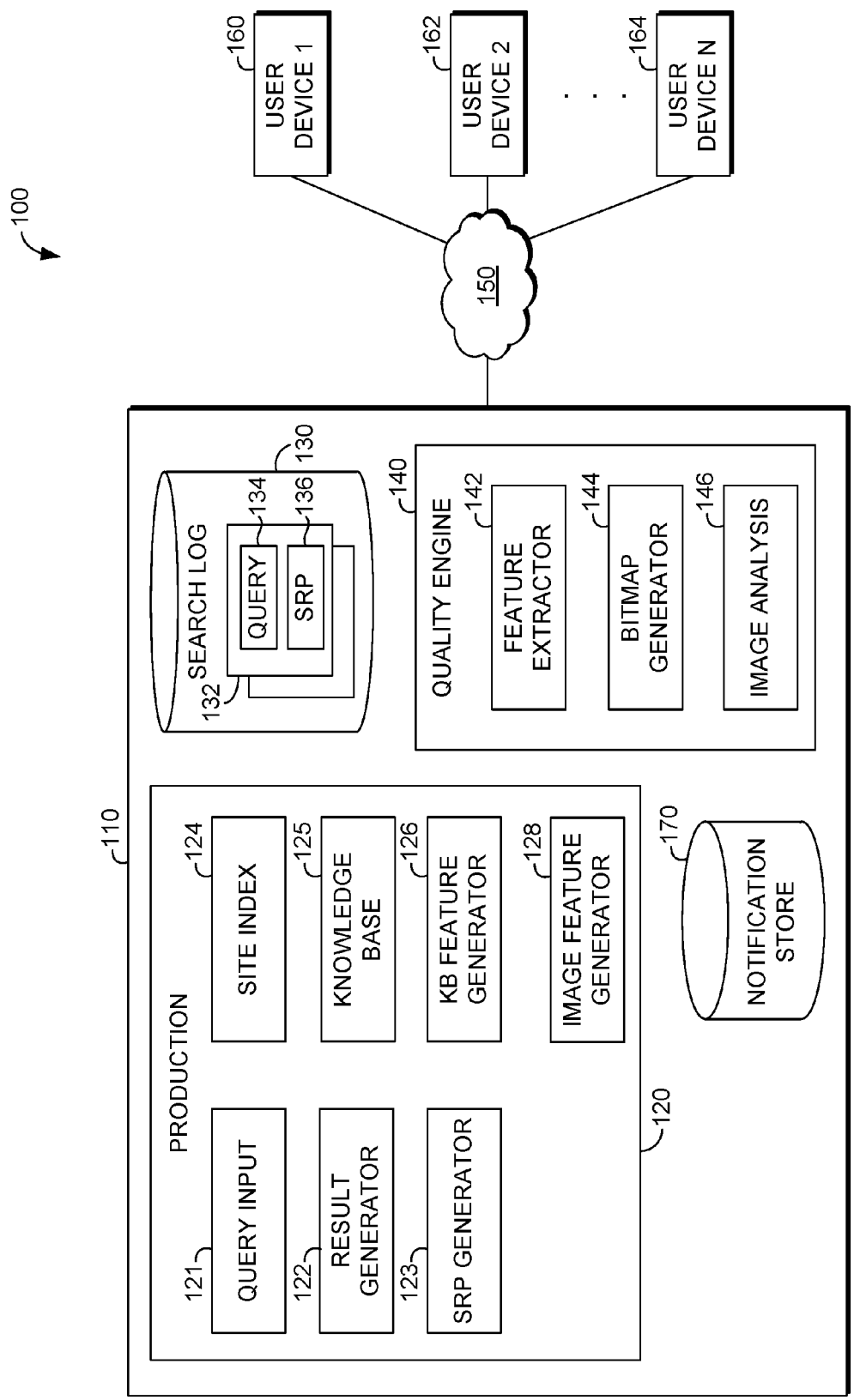
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps disclosed herein unless and except when the order of individual steps is explicitly described.

Aspects of the technology described herein detect visible abnormalities within a webpage or other document. The technology improves computing accuracy by identifying data and/or programing errors that cause the abnormalities. The abnormalities are detected through image analysis of portions of a document. Initially, a portion of a webpage associated with a particular feature is identified and then converted to a digital image. The digital image can capture the website as it would appear to a user viewing the website, for example, in a web browser application. The image is then analyzed against an established feature-pattern for the feature to determine whether the image falls outside of a normal range. When the image of a portion of the webpage falls outside of the normal range, a notification can be communicated to a person associated with the webpage, such as a system administrator.

In one aspect, the technology is used to analyze dynamic websites with content that changes automatically. For example, the technology can be used to analyze one or more features of a search results webpage. The search result webpage is dynamically generated by combining data selected from one or more sources with a display template. The display templates may be similar for each page, but the data selected can be unique for each page. Given the combination of factors that are used to select and rank search results, a very large amount of unique search result pages could be built. It is not practical to run quality checks for each possibility in advance.

A search results webpage can comprise multiple features, such as a paid search result, a normal search result, a search result with deep links, a knowledge base presentation of information about a person, place, or thing, an image, a review section, a rating section, and a word definition section. A particular feature may be triggered in certain circumstances and individual search result pages can display content provided by different features. For example, the word definition feature could be triggered by submitting a query starting "definition of . . . ". The definition feature would not appear on a search result page unless the trigger was satisfied. Each feature of a search results webpage can be generated by a particular function or program. The function can identify relevant information and populate the information into a display template that causes the information to be displayed on the search results webpage. Aspects of the technology can evaluate each feature separately against other instances of the feature.

Display errors can have many different causes including template errors and information errors. For example, perhaps a knowledge base does not include information about a particular entity for one or more fields that are included in the display template for a feature. In such a situation, the associated display fields might be blank when the feature is displayed on the search results page. In another example, the images of a person could include images of a different person, of an animal, or some other object. In other words, the image may be associated with an entity in a query but not actually belong in the search results. In another example, a template could provide more space than is needed to present the information, creating lots of wasted space. Aspects of the technologies can detect these irregularities and generate a notification that can alert a system administrator of the need to investigate the possible errors.

Turning now to FIG. 1, a computing environment 100 suitable for implementing aspects of the technology described herein is provided. The computing environment 100 comprises a search data center 110, a wide area network 150, such as the Internet, and multiple user devices, such as a first user device 160, a second user device 162, and an Nth user device 164. Very generally, a person may enter a query through a user device. The query is communicated over the wide area network 150 to the search data center 110. The production search engine 120 can receive the query and output a search results page for the user that is communicated over the wide area network 150 to a web browser running on the user device. The user device then outputs the search results webpage for display to the user.

The search data center 110 can comprise a larger number of computing devices and computing storage. The computers in the data center can be distributed geographically or located in a particular location, such as in a single building.

The search data center 110 includes a production version of a search engine 120, a search log 130, a quality engine 140, and a notification store 170. Very generally, the production search engine 120 receives a query and generates a search results page. The data center can comprise one or more non-production search engines (not shown) that are being tested, but are not presenting results to customers. The search log 130 stores the queries, search results generated in response to the query, and other information, such as user interactions with the search results. A search record 132 can include a query 134 along with a record of content 136 shown on a search results page generated in response to the query 134. User interaction data such as clicks, hovering, dwell time, and other characteristics can also be stored as part of the query record. The search log 130 could include millions or hundreds of millions of search records. Though depicted as a single file, the data can be stored in data streams or other formats. However the data is stored, the end result is that a query can be associated with the results on a search results page and user interactions with those results through an analysis of the search records 132.

The production search engine 120 comprises a query input interface 121, a result generator 122, a search result page generator 123, a site index 124, a knowledge base 125, a knowledge-base feature generator 126, and an image feature generator 128.

The query input interface 121 receives a query from an end user device. The query input component may receive a query input through a search box output on a search page. The query input interface 121 can provide services like spelling correction and query completion. The query input interface 121 submits a query to a result generator 122. The result ranker uses the query to generate relevant search results, such as webpages, documents, and other components of a search result and then ranks them according to relevance. The result generator 122 can use a site index 124 to identify relevant results. The site index 124 can be generated by a web crawler or other methodology that extracts keywords from webpages and organizes them into a searchable index. The keywords in the site index 124 can be matched with the keywords in the query input.

The knowledge base 125 can include a corpus of facts and relationships between those facts. For example, the knowledge base can include a plurality of persons, places, things, and facts associated with those people, places, or things. The knowledge base 125 could also include images or links to images of those people, places, or things. For example, the knowledge base 125 could include information about various mountains, streams, cities, celebrities, politicians, and other well-known people.

Figure 2:
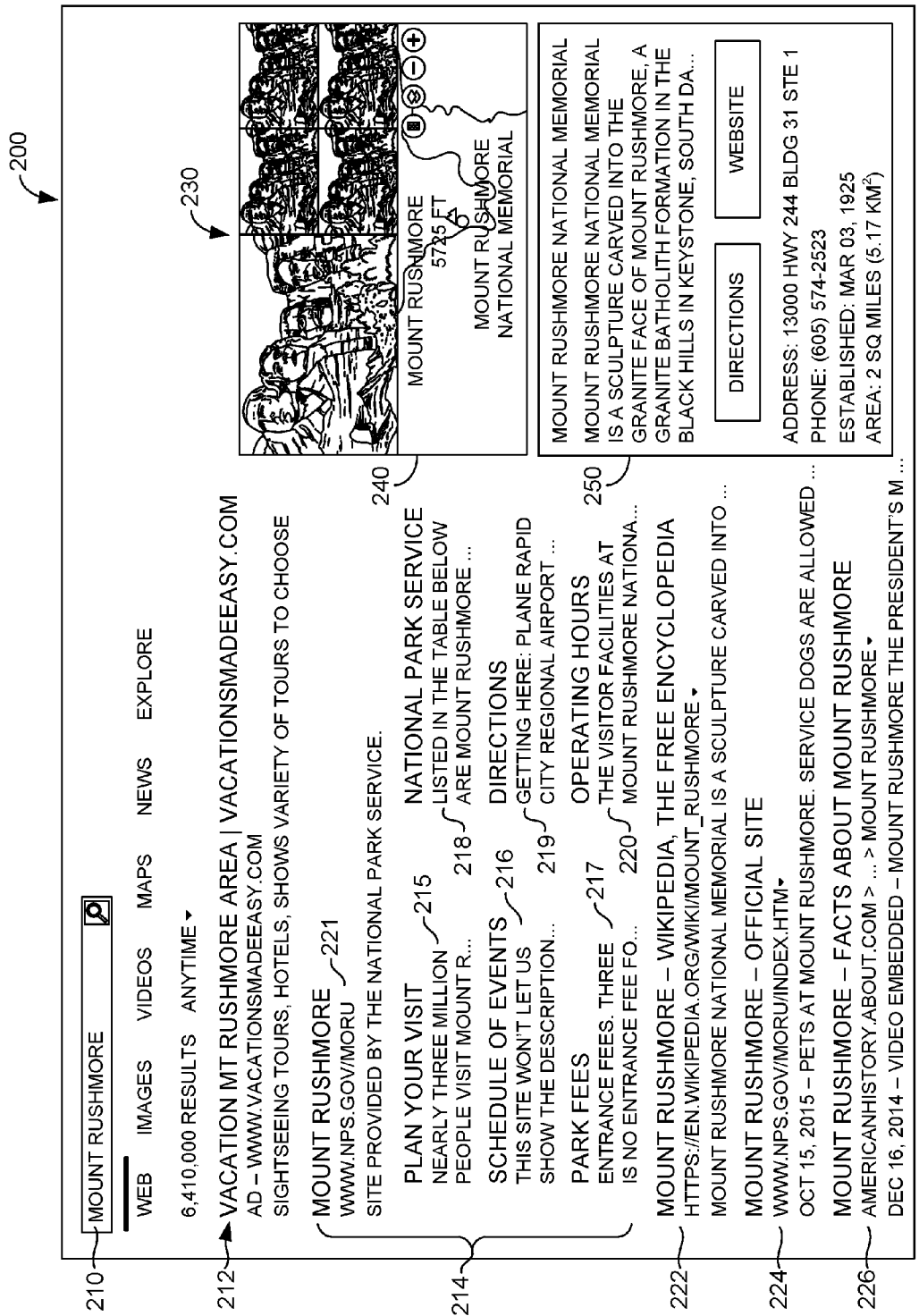
FIG. 2 is a diagram depicting an exemplary search results page with multiple output features suitable for testing, in accordance with an aspect of the technology described herein.

The knowledge-base feature generator 126 generates a knowledge base feature, such as knowledge base feature 250 in FIG. 2, for a search results webpage. Features can take several different forms and the knowledge base feature is just one example. In one aspect, the search results page can include multiple features in response to a given query. Whether a particular feature is generated in response to a particular query can be determined based on a threshold triggering criteria. For example, a query that appears to be seeking information about a person, place, or thing may trigger a feature that provides a knowledge base output on the search results webpage. The knowledge base output can provide information about that person from the knowledge base. This type of feature may be associated with a display template where different fields within the template can be populated with information from the knowledge base. For example, a particular field could be designated for a birthdate, a hometown, employment, or other relevant information.

The image feature generator 128 generates a display of images, such as image feature 230 in FIG. 2. The image feature could be triggered when the query includes a person, place, or thing for which pictures are available.

The quality engine 140 can analyze generated search result pages for anomalies or irregularities. As input, the quality engine 140 can analyze previously generated search result pages, in one instance; search results pages are stored for analysis as they are generated. In another instance, the quality engine 140 runs queries from a query log through the production search engine to generate search result pages that can be analyzed for anomalies. Either way, the input is a displayable search results page.

The feature extractor 142 identifies a portion of a displayed webpage that is associated with a feature. For example, a feature may generate a table of information about a celebrity. The feature extractor 142 would identify a portion of the displayed webpage associated with that feature. In other words, the portion of the webpage where a user would view the table including celebrity facts is identified. In one aspect, the feature extractor runs an xpath function to identify the boundaries of the feature area. The feature extractor 142 captures an image of the feature area as it appears to a user based on the boundaries.

The bitmap generator 144 can convert the image captured by the feature generator into a bitmap (if the image is not originally captured as a bitmap) that can be used for analysis on a pixel-by-pixel basis by the image analysis component 146.

The image analysis component 146 can perform one or more different operations on the bitmap or raw image to detect an abnormality. In one instance, the image analysis component 146 analyzes a plurality of images or bitmaps to determine a baseline or normal range for the feature. Each operation or analysis procedure can focus on a particular aspect of the image.

For example, in one operation, a percentage of the image that comprises background is determined. As part of this process, the background color of the image can be determined and then each pixel can be classified as being in the background color or not. In this way, a percentage of pixels within the image can be classified as background. Determining a percentage range can be accomplished by determining an average percentage background and then calculating a standard deviation from the average. In one aspect, the normal range is bounded by the background percentage that is one standard deviation above and below the average background percentage.

Figures 3, 4:
FIG. 3 is a diagram depicting a table with inadequate data, in accordance with an aspect of the technology described herein.
FIG. 4 is a diagram depicting a table with adequate data, in accordance with an aspect of the technology described herein.

FIGS. 3 and 4 show tables that can be evaluated using background analysis. Table 300 includes a visual abnormality created by the absence of information. As can be seen, several of the cells in table 300 are blank. In contrast, all of the cells in table 400 include text or data. In one aspect of the technology, an analysis is performed on the table to determine a percentage of background color. The analysis may first determine the background color and then count the number of pixels in an image that match the background color. The percentage could be determined by dividing the number of pixels that match the background color by the total number of pixels in the image. As can be seen, the percentage of pixels that match the background color would be higher in table 300 than in table 400. If the tables that form a baseline background percentage are more similar to table 400, then table 300 could fall outside of a normal range for tables generated according to a particular feature. An abnormality notification could then be generated for table 300. The abnormality is a link to a query or a document from which table 300 was extracted.

Once the normal range is calculated, individual images can be compared against the range. Images that fall outside of the normal range can be classified as anomalies and used to generate an error notification that is stored in notification store 170. As part of a notification, the image or screen capture can be included along with the query and even the entire search results webpage. A programmer or other person could then review all the notifications to confirm that an abnormality is present and investigate the cause of the abnormality.

As another example, an aspect of the image could be the largest rectangle identified within the image. The largest rectangle in each image could be identified with an average then calculated across all of the images. In one aspect, the Hough transform is used to identify rectangles within an image. The size of each rectangle can be calculated and compared to identify the largest. As described above, a normal range for the largest rectangle could be identified and any images including a rectangle having a size above the normal range could be flagged for a notification. The inclusion of a rectangle above a threshold size suggests that data could be missing from a table or there is a mismatch between the size of the field designated within the display template and the actual amount of data in the field. For example, a large display field could be associated with data that is only a few characters long.

Turning now to FIG. 5, a rectangle comparison analysis is illustrated. Table 500 could be captured from a search results page or other document. In one aspect, the feature associated with table 500 is isolated from the rest the document from which the image is created. In this case, an analysis is performed to identify the largest rectangle comprising only background color pixels within the image. The size of the rectangle can be compared with a normal range for rectangles within images of tables generated by the same feature that generated table 500. If the size rectangle 510 is outside the normal range for the largest rectangle found within images of tables generated by the feature, the notification could be generated. The size could be measured in total area, length, height, diagonal, or some other measure. Notice that the abnormality associated with rectangle 510 could be an absence of data in one or more columns or a mismatch between the available data and the space allocated for the data. In other words, the column allocated to the year data appears to be much wider than is needed to present the data.

Other types of image analyses can be performed by the image analysis component 146. Turning now to FIGS. 6 and 7, an average image analysis is illustrated, according to an aspect of the present technology. FIG. 6 shows an average image 600 generated by averaging a plurality of images taken of a table feature. For example, the average image 600 could be the result of combining each image. The average image 600 can be generated through one or more techniques. In one technique, the first image is added to the second image with 50% opacity. The third image is added to the combination of the first and second images with 33% opacity. Each new image is added with 1/n opacity, where n equals the total images input to average image. In another technique, the composite is generated by calculating an average pixel color for each pixel captured across all images. For example, if a particular pixel (10,150) was black in half the images and white in the other half, then the particular pixel's average color would be a grey exactly between white and black. This process is repeated for each pixel.

As can be seen, the composite image includes several rows 610, 612, 614, and 616 of approximately the same shade of grey. In contrast, rows 618, 620, and 622 are much lighter. In one instance, the darkness of the row can be used to establish a normal range. For example, a color of row 612 could be used to establish a normal row. Images that contribute non-background pixels to rows that are more than a threshold from the normal color can be designated as abnormal. The images could then be linked to the documents from which the images where taken and the query used to form the document, if applicable.

With some implementations, anomalies are more apparent to the human eye when a negative of the average image is created. FIG. 7 shows a negative image 700 of the average image 600. The negative image 700 illustrates that row 622 comprises text from a single image from the plurality of images.

Turning now to FIG. 2, an exemplary search results page 200 that could be analyzed by the technology described herein for visual anomalies is shown, according to an aspect of the present technology. As mentioned, the search results webpage is one example of a document that can be generated by identifying relevant data and then displaying the data by fitting the data into visual templates. A mismatch between the data available and the templates can create visual anomalies.

The search results page 200 includes multiple features. Each feature can be generated by a program that retrieves relevant data and then generates a presentation of the data according to a visual template. The features include a paid ad feature 212, a deep link search-result feature 214, standard search results 222, 224, and 226, an image feature 230, a map feature 240, and a knowledge base feature 250.

The paid ad feature 212 can be generated by identifying an advertiser that wishes to present a paid search result in response to the query 210. The paid ad feature 212 can then be generated by retrieving information from the advertiser or advertiser's webpage. The paid ad feature 212 can be generated dynamically by retrieving information from an advertiser's webpage and building a paid search result.

The deep link search-result feature 214 shows a homepage 221 and several deep linked pages within the same site that can be accessed through the homepage 221. The deep linked pages include a plan your visit page 215, a schedule of events page 216, a park fees page 217, a National Park Service page 218, the directions page 219, and operating hours page 220.

The image feature 230 retrieves images from an image database that are responsive to the search query 210. The images could be labeled with metadata describing the content of the image, in this case Mount Rushmore. Aspects of the technology can compare images presented in this feature with each other. Outliers can be flagged for further analysis.

The map feature 240 shows a map surrounding the location of Mount Rushmore along with nearby roads. Aspects of the technology can capture an image of the map and compare with images of other maps to detect differences.

The knowledge base feature 250 includes facts and figures for Mount Rushmore. Mount Rushmore can be included in a knowledge base that associates facts and figures with various people, places, or things. Each fact can have a label and associated variables. The label on variables can be combined into a display template to generate the knowledge base feature 250. A knowledge base feature could be evaluated based on the techniques described previously with reference to FIGS. 3-7.

As mentioned, aspects of the technology can capture an image of a particular feature and perform an image analysis that allows for a comparison of visible characteristics of the image with a baseline or normal range for the feature. The baseline or normal range can be generated by averaging the visible characteristics for a feature for a statistically significant sample of features. Once a normal range is established, individual instances of a feature that fall outside of a range can be flagged for further analysis.

Turning now to FIG. 8, a method 800 of detecting display abnormalities through image analysis is provided. The document could be a search results page. In one aspect, the feature is responsible for only a portion of the visible content in the document. A single document can comprise content generated by multiple features. The feature can be generated automatically by retrieving relevant data and generating a visible presentation.

At step 810, an area of a document in which a particular feature is displayed is identified. The area may be identified by running an xpath function that identifies where on a display a feature is output.

At step 820, an image of the area is generated. The image can be generated by a screenshot function that captures an image of the area only. The screenshot can take many formats. In one example, the screenshot is a bitmap file. In another example, the screenshot is converted to a bitmap prior to analysis.

At step 830, a score for a visible characteristic of the image is calculated by measuring the visible characteristic through the image analysis of the image. The score can be an amount directly measured, for example, a number of pixels within an image that are the background color. In this example, the pixel color is the visible characteristic. The score can also be derived from the measurement, such as a percentage of the total pixels in an image that are the background color. The score could be a size of the largest rectangle within an image. In this example, the visible characteristic can be a rectangle. The score could be a confidence factor or a similarity score. The confidence score could be an indication whether a particular classification should be applied to an image. In this example, the visible characteristic is the particular classification category, such as includes a building, person, etc. The similarity score could measure how similar an image is to another image. In this example, the visible characteristic is another image.

At step 840, a visible abnormality is determined to be present within the image by determining that the score is outside of a normal range for the particular feature. The visible abnormality could result from a lack of data or a mismatch between the size of the data and the space provided to present the data. Examples of data mismatches can include those described with reference to FIGS. 3-7.

At step 850, a notification indicating that the visible abnormality is present within the document is generated. The notification could be stored and retrieved for further evaluation by an analyst or other person involved with the document. The notification can identify one or more of the document, the image analysis used to detect the abnormality, the data source used to create the feature, the feature, the image of the area, etc.

Turning now to FIG. 9, a method of detecting visual anomalies in a multi-feature document is provided. In one aspect, the feature is responsible for only a portion of the visible content in the document. A single document can comprise content generated by multiple features. The feature can be generated automatically by retrieving relevant data and generating a visible presentation.

At step 910, for each of a plurality of documents that include a particular feature, an image that depicts the particular feature within a document as the particular feature would appear to a user viewing the document is generated, thereby forming a plurality of images.

At step 920, a normal range is calculated for a visible characteristic of the particular feature by measuring the visible characteristic for each of the plurality of images through an image analysis of the image.

At step 930, an area of a specific document that displays the particular feature is identified. The area may be identified by running an xpath function that identifies where on a display a feature is output.

At step 940, a specific image of the particular feature within the specific document is generated. The screenshot can take many formats. In one example, the screenshot is a bitmap file. In another example, the screenshot is converted to a bitmap prior to analysis.

At step 950, a score for the visible characteristic of the specific image is calculated by measuring the visible characteristic through the image analysis of the specific image. The score can be an amount directly measured, for example, a number of pixels within an image that are the background color. In this example, the pixel color is the visible characteristic. The score can also be derived from the measurement, such as a percentage of the total pixels in an image that are the background color. The score could be a size of the largest rectangle within an image. In this example, the visible characteristic can be a rectangle. The score could be a confidence factor or a similarity score. The confidence score could be an indication whether a particular classification should be applied to an image. In this example, the visible characteristic is the particular classification category, such as includes a building, person, etc. The similarity score could measure how similar an image is to another image. In this example, the visible characteristic is another image.

At step 960, a visible abnormality is determined to be present within the specific image by determining that the score is outside of the normal range for the particular feature. The visible abnormality could result from a lack of data or a mismatch between the size of the data and the space provided to present the data. Examples of data mismatches can include those described with reference to FIGS. 3-7.

At step 970, a notification is generated that the visible abnormality is present within the specific document. The notification could be stored and retrieved for further evaluation by an analyst or other person involved with the document. The notification can identify one or more of the document, the image analysis used to detect the abnormality, the data source used to create the feature, the feature, the image of the area, etc.

Figure 10:
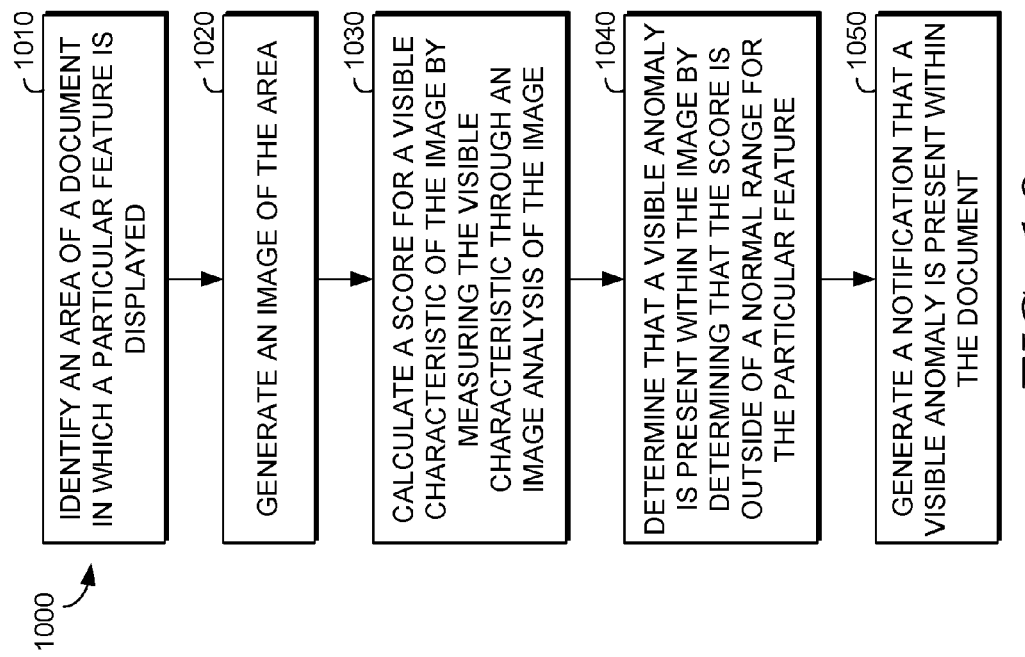
FIG. 10 is a diagram depicting a flow chart for a method of detecting display abnormalities using image analysis, in accordance with an aspect of the technology described herein.

Turning now to FIG. 10, a method 1000 of detecting visual anomalies in a multi-feature document is provided. A single document can comprise content generated by multiple features. The features can be generated automatically by retrieving relevant data and generating a visible presentation.

At step 1010, an area of a search results page that displays a particular feature is identified. The search results page comprises multiple features that display content responsive to a search query. The area may be identified by running an xpath function that identifies where on a display a feature is output.

At step 1020, an image of the area that displays the particular feature is generated. The image captures the particular feature as the particular feature would appear to a user. The image can take many formats. In one example, the screenshot is a bitmap file. In another example, the screenshot is converted to a bitmap prior to analysis.

At step 1030, a score for a visible characteristic of the image is calculated by measuring the visible characteristic through an image analysis of the image. The score can be an amount directly measured, for example, a number of pixels within an image that are the background color. In this example, the pixel color is the visible characteristic. The score can also be derived from the measurement, such as a percentage of the total pixels in an image that are the background color. The score could be a size of the largest rectangle within an image. In this example, the visible characteristic can be a rectangle. The score could be a confidence factor or a similarity score. The confidence score could be an indication whether a particular classification should be applied to an image. In this example, the visible characteristic is the particular classification category, such as includes a building, person, etc. The similarity score could measure how similar an image is to another image. In this example, the visible characteristic is another image.

At step 1040, an abnormality is determined to be present within the image by determining that the score is outside of a normal range for the particular feature. The visible abnormality could result from a lack of data or a mismatch between the size of the data and the space provided to present the data. Examples of data mismatches can include those described with reference to FIGS. 3-7.

At step 1050, a notification is generated indicating that the visible abnormality is present within the search results page. The notification could be stored and retrieved for further evaluation by an analyst or other person involved with the document. The notification can identify one or more of the document, the image analysis used to detect the abnormality, the data source used to create the feature, the feature, the image of the area, etc.

Exemplary Operating Environment

Referring to the drawings in general, and initially to FIG. 11 in particular, an exemplary operating environment for implementing aspects of the technology described herein is shown and designated generally as computing device 1100. Computing device 1100 is but one example of a suitable computing environment and is not intended to suggest any limitation as to the scope of use of the technology described herein. Neither should the computing device 1100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 11, computing device 1100 includes a bus 1110 that directly or indirectly couples the following devices: memory 1112, one or more processors 1114, one or more presentation components 1116, input/output (I/O) ports 1118, I/O components 1120, and an illustrative power supply 1122. Bus 1110 represents what may be one or more busses (such as an address bus, data bus, or a combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 11 and refer to "computer" or "computing device." The computing device 1100 may be a PC, a tablet, a smartphone, virtual reality headwear, augmented reality headwear, a game console, and such.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer storage media in the form of volatile and/or nonvolatile memory. The memory 1112 may be removable, non-removable, or a combination thereof. Exemplary memory includes solid-state memory, hard drives, optical-disc drives, etc. Computing device 1100 includes one or more processors 1114 that read data from various entities such as bus 1110, memory 1112, or I/O components 1120. Presentation component(s) 1116 present data indications to a user or other device. Exemplary presentation components 1116 include a display device, speaker, printing component, vibrating component, etc. I/O ports 1118 allow computing device 1100 to be logically coupled to other devices, including I/O components 1120, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1114 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1100. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

The computing device 1100 may include a radio 1124. The radio transmits and receives radio communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Embodiments

Embodiment 1. A computing device comprising: at least one processor; and memory having computer-executable instructions stored thereon that, based on execution by the at least one processor, configure the computing device to detect display abnormalities through image analysis by being configured to: identify an area of a document in which a particular feature is displayed; generate an image of the area; calculate a score for a visible characteristic of the image by measuring the visible characteristic through analysis of the image; determine that a visible abnormality is present within the image by determining that the score is outside of a normal range for the particular feature; and generate a notification that the visible abnormality is present within the document.

Embodiment 2. The computing device of embodiment 1, wherein the visible characteristic is a percentage of pixels within the image that matches a background color of the particular feature.

Embodiment 3. The computing device as in any one of the preceding embodiments, wherein the visible characteristic is a size of a largest rectangle within the image comprising only pixels of a background color of the particular feature.

Embodiment 4. The computing device as in any one of the preceding embodiments, wherein the visible characteristic is a confidence score that the image includes a human face.

Embodiment 5. The computing device as in any one of the preceding embodiments, wherein the document is a search results page generated in response to a query submitted by a user.

Embodiment 6. The computing device as in any one of the preceding embodiments, wherein the particular feature is a knowledge base feature generated by extracting facts from a knowledge base that describe an entity included within the query.

Embodiment 7. The computing device as in any one of the preceding embodiments, wherein the particular feature presents data in a table.

Embodiment 8. A method of detecting visual anomalies in a multi-feature document comprising: for each of a plurality of documents that include a particular feature, generating an image that depicts the particular feature within a document as the particular feature would appear to a user viewing the document, thereby forming a plurality of images; calculating a normal range for a visible characteristic of the particular feature by measuring the visible characteristic for each of the plurality of images through an image analysis of the image; identifying an area of a specific document that displays the particular feature; generating a specific image of the particular feature within the specific document; calculating a score for the visible characteristic of the specific image by measuring the visible characteristic through the image analysis of the specific image; determining that a visible abnormality is present within the specific image by determining that the score is outside of the normal range for the particular feature; and generating a notification that the visible abnormality is present within the specific document.

Embodiment 9. The method of embodiment 8, wherein the document is a search results page generated in response to a search query.

Embodiment 10. The method according to embodiments 8 or 9, wherein the notification comprises the search query.

Embodiment 11. The method according to embodiments 8, 9, or 10, wherein the particular feature is generated by combining data relevant to the search query with a display template for the particular feature.

Embodiment 12. The method according to embodiments 8, 9, 10, or 11, wherein the method further comprises determining a location of the particular feature within the document by using an xpath function.

Embodiment 13. The method according to embodiments 8, 9, 10, 11, or 12, wherein the visible characteristic is a percentage of pixels within the specific image that matches a background color of the particular feature.

Embodiment 14. The method according to embodiments 8, 9, 10, 11, 12, or 13, wherein the visible characteristic is a size of a largest rectangle within the specific image comprising only pixels of a background color of the particular feature.

Embodiment 15. The method according to embodiments 8, 9, 10, 11, 12, 13, or 14, wherein the method further comprises retrieving the plurality of documents from a query log.

Embodiment 16. A method of detecting visual anomalies in a multi-feature document comprising: identifying an area of a search results page that displays a particular feature, wherein the search results page comprises multiple features that display content responsive to a search query; generating an image of the area, the image capturing the particular feature as the particular feature would appear to a user; calculating a score for a visible characteristic of the image by measuring the visible characteristic through an image analysis of the image; determining that a visible abnormality is present within the image by determining that the score is outside of a normal range for the particular feature; and generating a notification that the visible abnormality is present within the search results page.

Embodiment 17. The method of embodiment 16, wherein the visible characteristic is a size of a largest rectangle within the image comprising only pixels of a background color of the particular feature.

Embodiment 18. The method according to embodiments 16 or 17, wherein the visible characteristic is a percentage of pixels within the image that matches a background color of the particular feature.

Embodiment 19. The method according to embodiments 16, 17, or 18, wherein the area of the search results page that displays the particular feature is identified using an xpath function.

Embodiment 20. The method according to embodiments 16, 17, 18, or 19, wherein the particular feature is generated by combining data relevant to the search query with a display template for the particular feature.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method of detecting visual anomalies in a multi-feature document comprising:
for each of a plurality of documents that include a particular feature, generating an image that depicts the particular feature within a document as the particular feature would appear to a user viewing the document, thereby forming a plurality of images;
calculating a normal range for a visible characteristic of the particular feature by measuring the visible characteristic for each of the plurality of images through an image analysis of the image;

identifying an area of a specific document that displays the particular feature;

generating a specific image of the particular feature within the specific document;

calculating a score for the visible characteristic of the specific image by measuring the visible characteristic through the image analysis of the specific image, wherein the visible characteristic is a size of a largest rectangle within the specific image comprising only pixels of a background color of the particular feature;

determining that a visible abnormality is present within the specific image by determining that the score is outside of the normal range for the particular feature; and generating a notification that the visible abnormality is present within the specific document.

2. The method of claim 1, wherein each of the plurality of documents is a search results page generated in response to a search query.

3. The method of claim 2, wherein the notification comprises the search query.

4. The method of claim 2, wherein the particular feature is generated by combining data relevant to the search query with a display template for the particular feature.

5. The method of claim 2, wherein the method further comprises determining a location of the particular feature within the specific document by using an xpath function.

6. The method of claim 2, wherein the method further comprises retrieving the plurality of documents from a query log.

7. The method of claim 1, wherein the visible characteristic is a percentage of pixels within the specific image that matches a background color of the particular feature.

8. A computing device comprising:
at least one processor; and
memory having computer-executable instructions stored thereon that, based on execution by the at least one processor, configure the computing device to detect display abnormalities through image analysis by being configured to:
for each of a plurality of documents that include a particular feature, generate an image that depicts the particular feature within a document as the particular feature would appear to a user viewing the document, thereby forming a plurality of images;
calculate a normal range for a visible characteristic of the particular feature by measuring the visible characteristic for each of the plurality of images through an image analysis of the image;
identify an area of a specific document that displays the particular feature;
generate a specific image of the particular feature within the specific document;
calculate a score for the visible characteristic of the specific image by measuring the visible characteristic through the image analysis of the specific image, wherein the visible characteristic is a size of a largest rectangle within the specific image comprising only pixels of a background color of the particular feature;
determine that a visible abnormality is present within the specific image by determining that the score is outside of the normal range for the particular feature; and
generate a notification that the visible abnormality is present within the specific document.

9. The computing device of claim 8, wherein each of the plurality of documents is a search results page generated in response to a search query.

10. The computing device of claim 9, wherein the notification comprises the search query.

11. The computing device of claim 9, wherein the particular feature is generated by combining data relevant to the search query with a display template for the particular feature.

12. The computing device of claim 9, wherein the method further comprises determining a location of the particular feature within the specific document by using an xpath function.

13. The computing device of claim 8, wherein the visible characteristic is a percentage of pixels within the specific image that matches a background color of the particular feature.

14. The computing device of claim 8, wherein the method further comprises retrieving the plurality of documents from a query log.

15. One or more computer storage media, that when executed by a computing device, cause the computing device to perform a method of detecting visual anomalies in a multi-feature document comprising:
for each of a plurality of documents that include a particular feature, generating an image that depicts the particular feature within a document as the particular feature would appear to a user viewing the document, thereby forming a plurality of images;
calculating a normal range for a visible characteristic of the particular feature by measuring the visible characteristic for each of the plurality of images through an image analysis of the image;
identifying an area of a specific document that displays the particular feature;
generating a specific image of the particular feature within the specific document;
calculating a score for the visible characteristic of the specific image by measuring the visible characteristic through the image analysis of the specific image, wherein the visible characteristic is a size of a largest rectangle within the specific image comprising only pixels of a background color of the particular feature;
determining that a visible abnormality is present within the specific image by determining that the score is outside of the normal range for the particular feature; and
generating a notification that the visible abnormality is present within the specific document.

16. The media of claim 15, wherein each of the plurality of documents is a search results page generated in response to a search query.

17. The media of claim 16, wherein the notification comprises the search query.

18. The media of claim 16, wherein the particular feature is generated by combining data relevant to the search query with a display template for the particular feature.

19. The media of claim 16, wherein the method further comprises determining a location of the particular feature within the specific document by using an xpath function.

20. The media of claim 16, wherein the method further comprises retrieving the plurality of documents from a query log.

21. The media of claim 15, wherein the visible characteristic is a percentage of pixels within the specific image that matches a background color of the particular feature.

* * * * *